United States Patent [19]

Corey et al.

[11] Patent Number: 5,263,795
[45] Date of Patent: Nov. 23, 1993

[54] IN-SITU REMEDIATION SYSTEM FOR GROUNDWATER AND SOILS

[76] Inventors: John C. Corey, 212 Lakeside Dr.; Dawn S. Kaback, 1932 Cottonwood Dr.; Brian B. Looney, 1135 Ridgemont Dr., all of Aiken, S.C. 29803

[21] Appl. No.: 711,686
[22] Filed: Jun. 7, 1991
[51] Int. Cl.⁵ .................. B09B 3/00; E02D 3/00
[52] U.S. Cl. ........................ 405/128; 405/263
[58] Field of Search ............... 405/52, 128, 129, 258, 405/263, 264, 266; 166/266, 268; 588/249, 252

[56] References Cited

U.S. PATENT DOCUMENTS

| | | | |
|---|---|---|---|
| 3,823,776 | 7/1974 | Holmes | 166/261 |
| 4,079,783 | 3/1978 | Snavely et al. | 166/252 |
| 4,162,707 | 7/1979 | Yan | 166/252 |
| 4,183,407 | 1/1980 | Knopik | 166/314 |
| 4,220,203 | 9/1980 | Steeman | 166/271 |
| 4,268,188 | 5/1981 | McKay et al. | 405/128 |
| 4,342,732 | 8/1982 | Smith | 405/128 X |
| 4,356,866 | 11/1982 | Savins | 166/261 |
| 4,436,153 | 3/1984 | Carlson | 166/260 |
| 4,484,629 | 11/1984 | Terry | 166/259 |
| 4,573,531 | 3/1986 | Garkusha et al. | 166/259 |
| 4,588,506 | 5/1986 | Raymond et al. | 210/606 |
| 4,637,465 | 1/1987 | Gash | 166/261 |
| 4,664,809 | 5/1987 | Fenton et al. | 210/663 |
| 4,765,902 | 8/1988 | Ely et al. | 210/610 |
| 4,780,215 | 10/1988 | Carlson | 210/722 |
| 4,839,061 | 6/1989 | Manchak et al. | 405/128 X |
| 4,849,360 | 7/1989 | Norris et al. | 435/264 |
| 4,892,664 | 1/1990 | Miller | 210/747 |
| 4,945,988 | 8/1990 | Payne et al. | 166/266 |
| 5,002,431 | 3/1991 | Heymans et al. | 405/128 |
| 5,017,289 | 5/1991 | Ely et al. | 405/128 X |

*Primary Examiner*—David H. Corbin
*Attorney, Agent, or Firm*—Harold M. Dixon; William R. Moser; Richard E. Constant

[57] ABSTRACT

A method and system for in-situ remediation of contaminated groundwater and soil where the contaminants, such as toxic metals, are carried in a subsurface plume. The method comprises selection and injection into the soil of a fluid that will cause the contaminants to form stable, non-toxic compounds either directly by combining with the contaminants or indirectly by creating conditions in the soil or changing the conditions of the soil so that the formation of stable, non-toxic compounds between the contaminants and existing substances in the soil are more favorable. In the case of non-toxic metal contaminants, sulfides or sulfates are injected so that metal sulfides or sulfates are formed. Alternatively, an inert gas may be injected to stimulate microorganisms in the soil to produce sulfides which, in turn, react with the metal contaminants. Preferably, two wells are used, one to inject the fluid and one to extract the unused portion of the fluid. The two wells work in combination to create a flow of the fluid across the plume to achieve better, more rapid mixing of the fluid and the contaminants.

12 Claims, 2 Drawing Sheets

5,263,795

IN-SITU REMEDIATION SYSTEM FOR GROUNDWATER AND SOILS

The United States Government has rights in this invention pursuant to Contract No. DE-AC09-89SR18035 between the U.S. Department of Energy and Westinghouse Savannah River Company.

BACKGROUND OF THE INVENTION

1. Field of the Invention

The present invention relates to a system for in-situ remediation of contaminated groundwater and soil. In particular the present invention relates to stabilizing toxic metals in groundwater and soil.

2. Discussion of the Background

Contaminated groundwater and soil pose serious health problems if local groundwater is used as a source of drinking water or the soil is used for growing crops and vegetation. Preventing contamination in the groundwater and soil from contaminating the drinking water and crops can be high.

Contaminated soil is usually removed by excavation; contaminated groundwater may be removed at times along with excavated soil and sometimes by pumping groundwater to the surface of the earth for treatment. Both excavating and pumping, although direct methods of dealing with the contamination, are expensive.

Recently, methods for drilling horizontal wells have been developed. In "Radial Wells and Hazardous Waste Sites," Wade Dickinson, R. Wayne Dickinson and Peter A. Mote, described a method for drilling horizontal wells for remediation of contaminated groundwater. "Horizontal" drilling is directional drilling that deviates significantly from the vertical. Wells placed into the contaminated area may be used for extraction of contaminated groundwater or to inject various treatment substances.

In U.S. Pat. No. 4,832,122. Corey, et al. describe a method and system for removing volatile contaminants from a subsurface plume of contamination. This system comprises two sets of wells, a well for injecting a fluid into a saturated zone on one side of or within the plume and an extracting well for collecting the fluid together with volatilized contaminants from the plume on the other side of, above or within the plume. The fluid enables the volatile contaminants to be volatilized and carried therewith through the ground to the extracting well. A system in accordance with that described in U.S. Pat. No. 4,832,122 was put to use on an area of contaminated groundwater beneath the location of an abandoned process sewer line that was known to have leaked chlorinated solvents. The site was carefully characterized and monitored using surface and borehole geophysics, cross hole geophysical tomography, chemical analysis of soil, soil gas and groundwater, microbial characterization of soil and water, and pressure monitoring in all affected areas. The total concentration of chlorinated solvents decreased rapidly during the first two days of operation and stabilized after approximately three days. Initial concentrations were as high as 5000 ppm in the gas and the total concentration stabilized at approximately 300 rpm. This concentration represents an extraction rate of approximately 100 to 140 pounds of solvent per day. The vacuum extraction process removed contaminants at a rate of 109 pounds per day; injection of air at the medium and high injection rates appears to result in the stripping/removal of an additional twenty pounds of solvents per day from the groundwater and the vadose zone below the extraction well. Almost 16,000 pounds of contaminant were removed from the vadose zone and groundwater at the site during the testing period. The system described by Corey, et al. is apparently effective for removing volatilizable contaminants in subsurface plumes but would not be effective for remediating nonvolatile contaminants such as metals.

There is a need for methods to remediate other contaminants in groundwater and soil.

SUMMARY OF THE INVENTION

According to its major aspects, the present invention is a method and system for in-situ remediation of groundwater and soil bearing a plume of contaminants. The method comprises injecting a fluid in spaced relation to the contaminant plume to cause the contaminants to form a stable, non-toxic compound either directly, by combining with the contaminants, or indirectly, by causing a change in the conditions in the soil that favors the formation of stable compounds between the contaminants and chemical substances existing in the soil. A stable compound is a compound that does not readily break down into its component parts. Indirect stabilization may include activity by naturally occurring microorganisms in the soil.

The system comprises a fluid that will cause the formation of a stable, non-toxic compound and a means for injecting it. The system may additionally comprise a means for extracting a portion of the fluid from the soil in order to draw the fluid across the plume so that the fluid has an effect throughout the plume.

For example, if sulfides or sulfates are injected into a subsurface system contaminated with metals, metal sulfides and sulfates, which are non-toxic and stable, will be formed. Injecting fluids that alter the pH may increase the reaction rates when sulfides or sulfates follow. Alternatively, if an inert gas is injected, microorganisms present in the soil will be stimulated by the resulting anoxic conditions to produce sulfides which will in turn react with the metal contaminants.

The use of the soil as a reaction vessel is a feature of the present invention. Rather than remove the contaminants from the soil and then treat them, the contaminants are treated in situ, that is, they are exposed to fluids that will react with them to form stable compounds or to fluids that will create conditions more favorable to the formation of compounds between the contaminants and substances in the soil. The advantage of this feature is that no massive excavation of soil is required and considerable cost is avoided.

Another feature of the present invention is the means for injecting the fluid which is preferably a well having a vertical shaft and at least one somewhat horizontal shaft for injecting the selected fluid into the plume, because plumes generally spread laterally, horizontal wells work especially well in bringing the fluid in proximity to the contaminants. Yet another feature of the present invention is the combination of an injecting and an extracting well. When the injecting and the extracting wells are placed across the plume from each other, the extracting well can draw the fluids to obtain a better diffusion of the fluids through the plume. The fluids will then be able to react with the contaminants more quickly and more thoroughly. If the fluid to be injected is a gas, the extracting well is best placed above the plume; if a liquid, below the plume. This feature increases the likelihood that all of the contaminants will be stabilized and speeds up the process, an especially important feature when the plume is spreading quickly.

Other features and advantages of the present invention will be apparent to those skilled in the art from a careful reading of the Detailed Description of Preferred Embodiments presented below and accompanied by the drawings.

DETAILED DESCRIPTION OF PREFERRED EMBODIMENTS

The present invention involves the in situ stabilization of contaminants in the subsurface system or in groundwater. The stabilization is achieved by causing the contaminants to combine with another chemical substance to yield a stable, non-toxic product which can remain in the ground or could be removed as desired or as convenient.

The stabilization is achieved by injecting a fluid into the ground through wells located in or near the plume of contamination so that the fluid will cause, either directly or indirectly, the chemical reaction with the contaminants.

Figure 1:
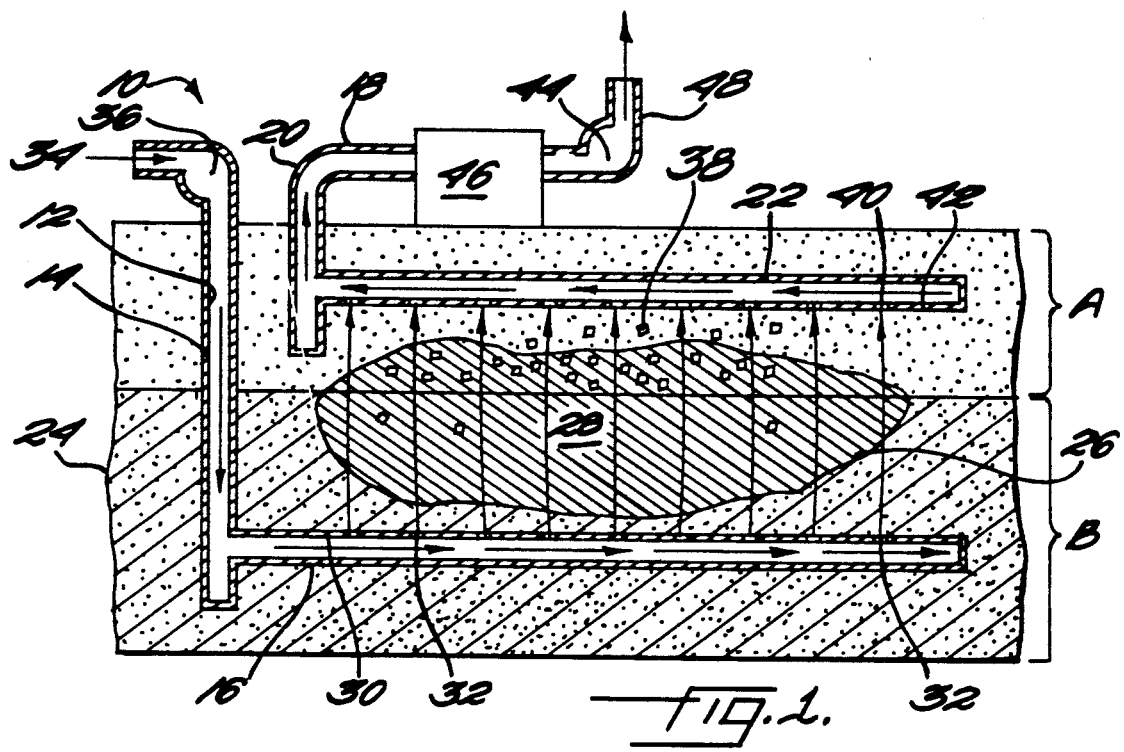
FIG. 1 is a cross-sectional side view of a preferred embodiment of the system according to the present invention.

One of the presently preferred embodiments of the system of the present invention is illustrated by reference numeral 10 in FIG. 1. System 10 comprises an injection well 12 with a vertical shaft 14 and a horizontal shaft 16, and an extraction well 18, with a vertical shaft 20 and a horizontal shaft 22, in a section of the earth's surface 24. Earth's surface 24 exists as an upper, vadose, or unsaturated zone, indicated generally at A and a lower, saturated zone, indicated generally at B. Horizontal shaft 16 is located beneath the plume 26 of contaminant 28. Horizontal shaft 16 has a casing 30, with multiple apertures 32, such as slots or perforations. The slots or perforations must be narrow enough to keep soil particles from blocking the movement of a fluid 34, with or without contaminant 28, from crossing casing 30, but large enough and numerous enough to allow fluid 34 to cross freely.

Fluid 34 is pumped into injection well 12 by first pump 36. Fluid 34 follows vertical shaft 14 to horizontal shaft 16. Fluid 34 then exits casing 30 through apertures 32 into saturated zone B and enters plume 26 where fluid 34 reacts either directly or indirectly with contaminant 28 and contaminant 28 becomes stabilized. Contaminant 28 may be Arsenic, Barium, Cadmium, Lead, Mercury, Nickel, Chromium, other toxic metals. Fluid 34 is selected based on the identity of contaminant 28, however, hydrogen sulfide is known to react with many metals directly to precipitate metal sulfides. Sulfides have been shown to dissolve very slowly in nature, and are therefore stable. Thus the contaminants combined with sulfides would yield a stable product that may be left in place and the concentration of free contaminant would be reduced to and remain at low concentrations following this reaction. Fluid 34 may also be a sulfate which is also known to react with toxic metals directly to produce a metal sulfate. Metal sulfates, however, are not as stable as metal sulfides and may need to be extracted from the site.

If extraction is needed or desired, the stabilized contaminant 38 may be carried by fluid 34 to horizontal shaft 22 of extraction well 18. Fluid 34 carrying stabilized contaminant 38 enters horizontal shaft 22 through apertures 40 in the casing 42 surrounding horizontal shaft 22. Stabilized contaminant 38 follows horizontal shaft 22 to vertical shaft 20 of extraction well 18, drawn by a second pump 44. At the surface of the earth, fluid 34 carrying stabilized contaminant 38 enters a treatment device 46 where fluid 34 may be separated from contaminant 38 and vented by an off-gas stack 48.

As important as providing a path for extraction of stabilized contaminant 38, extraction well 18 draws fluid 34 across plume 26 and achieves a more rapid diffusion of fluid 34 throughout plume 26 for better and more rapid mixing. When injection well 12 and extraction well 18 are placed across plume 26 from each other, and at least a portion of fluid 34 is received at extraction well 18, it will be known that the fluid has crossed plume 26 and come into contact with contaminants 38.

Injection of inert gases, such as nitrogen, creates an anoxic condition in the soil that encourages the naturally occurring sulfate-reducing microorganisms present in and around the plume to produce sulfides with the contaminant. Therefore, use of an inert gas indirectly stabilizes the contaminant. A portion of the gas and any stabilized contaminant traveling with it can be vented through the extraction pump.

Injections of sulfate stimulate the sulfate reducing microorganisms in and around the plume to form sulfide. This reactant could be used in combination with an inert gas as mentioned above. Some metals, such as barium, combine directly with sulfate to form barium sulfate, an insoluble precipitate. Sulfates may not be as stable as sulfides and may need to be extracted from the site. However, as an interim measure in a relatively fast-moving plume, sulfates can help stabilize otherwise toxic metals until extraction is possible.

Figure 2:
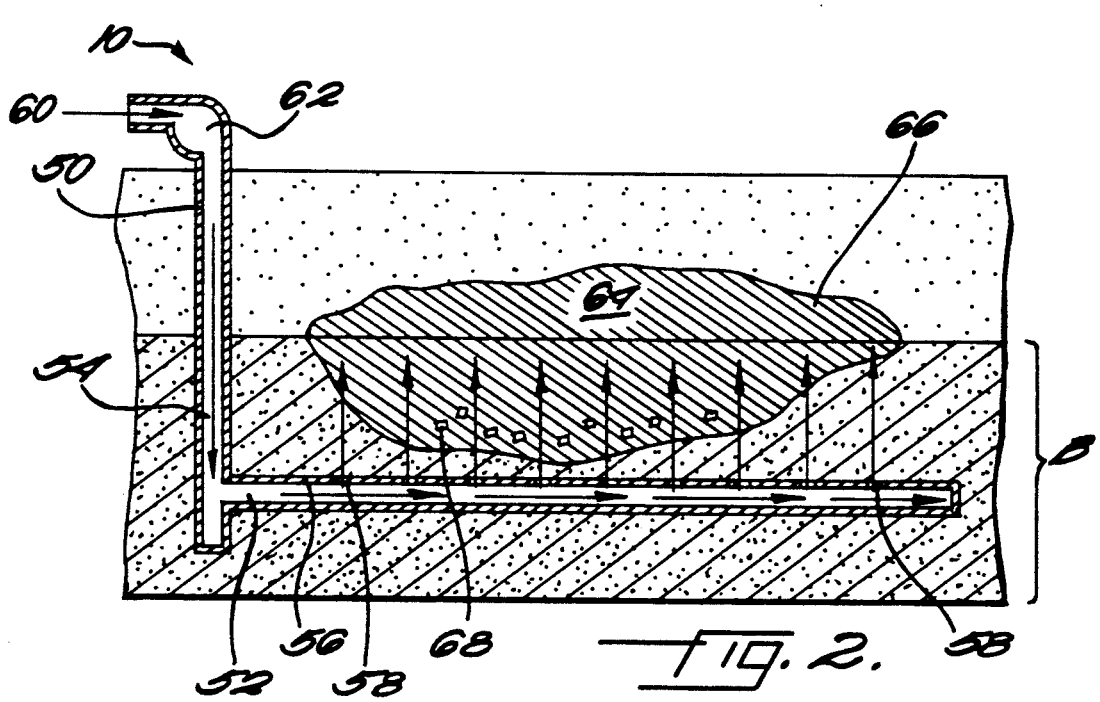
FIG. 2 is a cross-sectional side view of an alternative embodiment of the system of the present invention.

FIG. 2 illustrates a second embodiment of system 10 of the present invention. Shown is an injection well 50 with a single approximately horizontal shaft 52 branching from a single vertical shaft 54 into the saturated zone, indicated generally at B. Horizontal shaft 52 has a casing 56 with multiple apertures 58, such as slots or perforations. Fluid 60 is pumped into vertical shaft 54 by a pump 62 and follows vertical shaft 54 to horizontal shaft 52. Fluid 60 then exits casing 56 through apertures 58 and reacts with the contaminant 64 in the plume 66 to form a precipitate 68. In this embodiment, precipitate 68 is non-toxic and stable and may therefore be left in place. Hydrogen sulfide is a fluid which may be used if the contaminant is Arsenic, Cadmium, Lead, Mercury, Nickel or other toxic metals. This gaseous reactant at low concentrations will rapidly cause the metal to precipitate as a stable, non-toxic compound. Because sulfides dissolve slowly in nature, the groundwater concentrations in the former plume would be maintained at low concentrations following the reaction.

Figure 3:
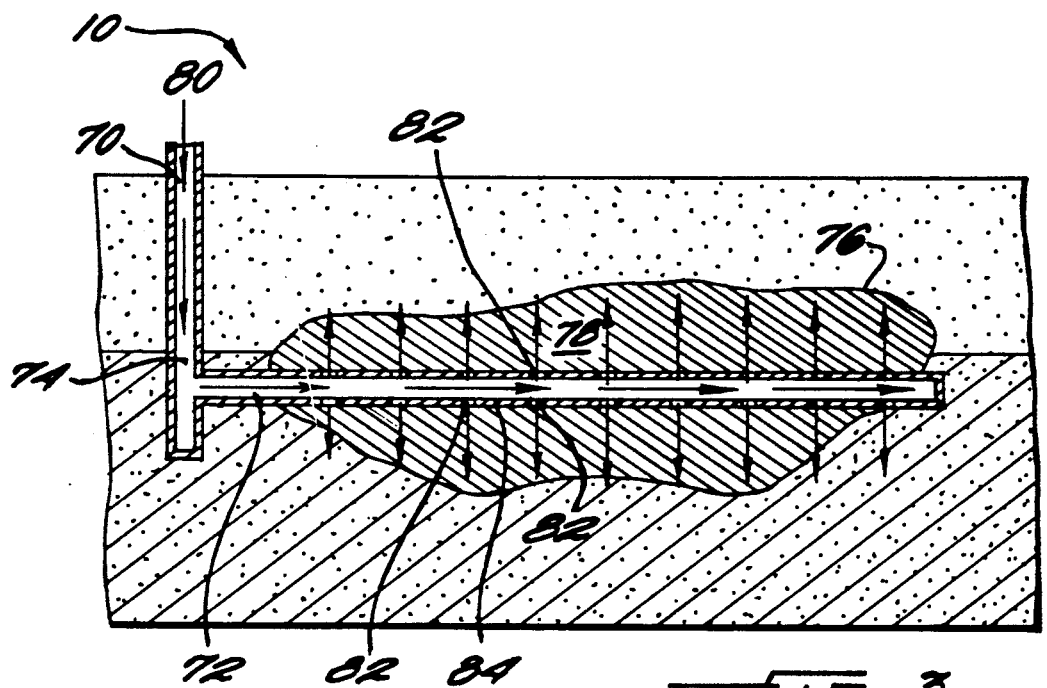
FIG. 3 is a cross-sectional side view of a second alternative embodiment of the system of the present invention.

FIG. 3 illustrates a third embodiment of system 10 of the present invention. Shown is an injection well 70 with a horizontal shaft 72 branching from a vertical shaft 74 placed within a plume 76 of contamination 78.

Fluid 80 is pumped into injection well 70 by a pump (not shown). Fluid 80 exits horizontal shaft 72 through multiple apertures 82 in the casing 84 surrounding horizontal shaft 72. Fluid 80 reacts with and stabilizes contaminant 78. Stabilized contaminant 78 may be left in place or pumped out by reversing the pumping action of the pump. If fluid 80 is volatile and must be contained, the earth's surface 86 may be covered with a fluid-impervious material (not shown) and fluid 80, with or without contaminant 78, extracted from between the impervious material and surface 86. The extracted fluid carrying contaminant 78 can be purified and recycled to injection well 70. Purification may be accomplished by any well known technique, such as passing the extracted fluid through an activated carbon filter or incinerating it.

Various bases or buffers, such as bicarbonate, hydroxide and others, may be injected to raise the pH within the reactive vessel surrounding the plume. In many cases, raising the pH will result in precipitation of metals that were traveling in acidified plumes. Excess buffering capacity can be added to keep the pH at the desired level. Since this is a liquid injection, the metals in the plume must be moving at a rate slower than the bulk fluid or the injection point be ahead of the plume.

Figure 4:
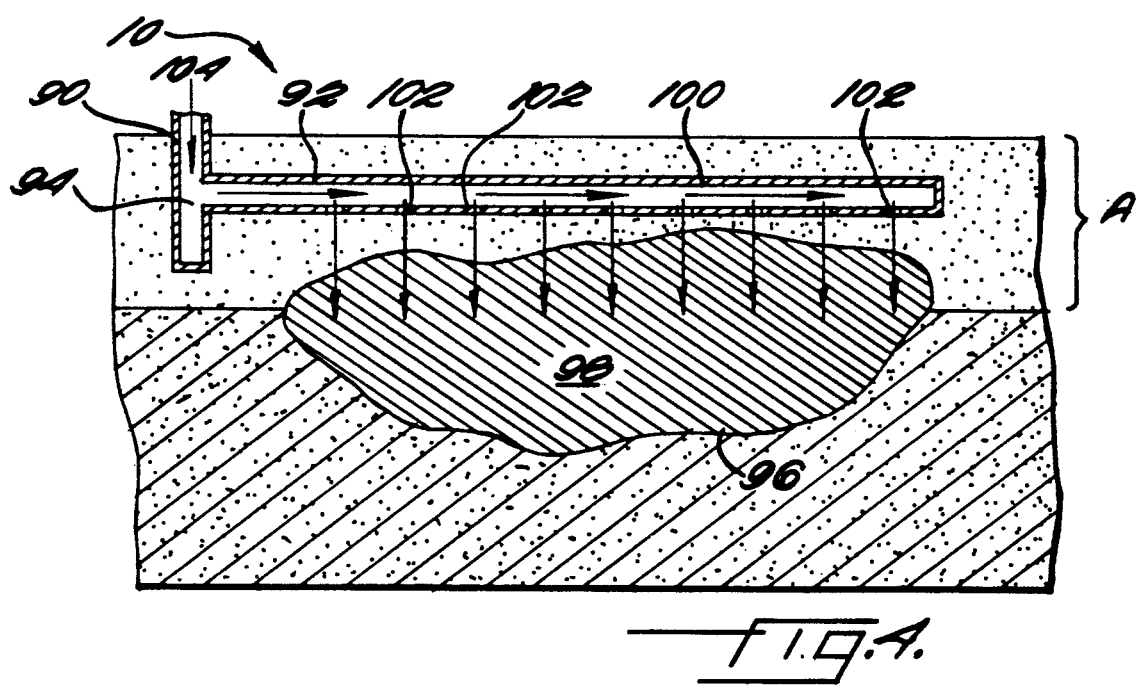
FIG. 4 is a cross-sectional side view of a third alternative embodiment of the system of the present invention.

FIG. 4 illustrates a fourth embodiment of system 10 of the present invention. Shown is an injection well 90 with a single horizontal shaft 92 branching from a single vertical shaft 94 into the vadose zone, indicated generally at A above a plume 96 of contamination 98. Horizontal shaft 92 has a casing 100 with multiple apertures 102 such as slots or perforations. Fluid 104 is pumped into injection well 90 by a pump (not shown) and flows through vertical shaft 94 into horizontal shaft 92. Fluid 104 then exits horizontal shaft 92 through multiple apertures 102 in casing 100 around horizontal shaft 92. Fluid 104 reacts with contaminant 98 to precipitate it in a stabilized form. Using sodium sulfide as the fluid to be injected results in a process similar to hydrogen sulfide. Because this fluid is a liquid, the metals in the plume would have to be moving at a rate slower than the bulk fluid. Several reductants could be used to stabilize various metals. These include bisulfite, metabisulfite, borohydride and others. The stability of the stabilized metals would need to be studied before a decision could be made to leave them in place.

A saturated zone plume tends to spread laterally making vertical wells less practical and horizontal wells ideal for influencing a substantial portion of the plume. Horizontal wells can be established to conform to the particular plume of contamination.

It is not necessary for the present invention that the well or wells be horizontal, that the shafts be circular, elliptical or closed in another particular shape, or that the injection and extraction wells have the same general configuration or be vertically stacked. The configuration is dictated by the size and shape of the plume, drilling economics and the subsurface geology.

For example, horizontal, radial "spokes" emanating from a vertical shaft or a single horizontal shaft branching from a vertical shaft may be best for some applications, such as containment of a plume along a boundary.

In use, the contaminant in the plume is identified and mapped so that the system of the present invention may be placed optimally. Depending on the identity of the contaminant, one or a group of reactants is selected to be injected into, beside, above, or below the plume. The reactant is injected into an injection well, flows into the contaminated area, reacts directly or indirectly with the contaminant to stabilize the contaminant, and unused reactant and stabilized contaminant are either left in place or extracted from the site through an extraction well. For gaseous fluids, injection in a lower injection well allows the gas to rise through a plume. For injecting liquids that are more dense than water, injection in a well above the plume is preferred, since the fluid will percolate downward.

It will be apparent to those skilled in the art that many changes and substitutions can be made to the preferred embodiment herein described without departing from the spirit and scope of the present invention which is defined by the appended claims.

What is claimed is:

1. A method for in-situ stabilization of a plume of metal contaminants in soil, said method comprising the step of:
   injecting a fluid selected from the group consisting essentially of sulfides and sulfates into said plume so that said fluid can react with said metals whereby said metals form metal sulfides and metal sulfates.

2. The method as recited in claim 1, wherein said method further comprises the step of changing the pH of said soil to increase the rate of reaction of said fluid with said metals.

3. The method as recited in claim 1, further comprising the step of drilling a well for injecting said fluid, said well being substantially horizontal and located within said plume.

4. The method as recited in claim 1, further comprising the steps of:
   drilling a first well on one side of said plume for injecting said fluid;
   drilling a second well on an opposing side of said plume; and
   extracting said fluid from said second well to draw said fluid through said plume.

5. A method for in-situ stabilization of a plume of metal contaminants is soil, said soil having microorganisms, said method comprising the step of:
   injecting an inert gas into said plume to create anoxic conditions in at least a portion of said plume so that said microorganisms create sulfides and sulfates that react with said metal contaminants.

6. The method as recited in claim 5, further comprising the step of drilling a well for injecting said gas, said well being substantially horizontal and running through said plume.

7. The method as recited in claim 5, further comprising the steps of:
   drilling a first well on one side of said plume for injecting said gas;
   drilling a second well on an opposing side of said plume; and
   extracting said gas from said second well to draw said gas through said plume from said first well to said second well.

8. An apparatus for use with a plume of metallic contaminants in the soil, said apparatus comprising:
   means for injecting, said injecting means located on one side of said plume;
   means for extracting, said extracting means located on an opposing side of said plume; and
   fluid means injected by said injecting means for delivering sulfides and sulfates proximate to said metallic contaminants to form metal sulfides and metal sulfates.

said extracting means drawing said fluid means through said plume.

9. The apparatus as recited in claim 8, wherein said fluid means is a fluid selected from the group consisting of sulfides and sulfates.

10. The apparatus as recited in claim 8, wherein said soil contains microorganisms and said fluid means further comprises an inert gas to create anoxic conditions in said soil so that said microorganisms produce sulfides and sulfates that react with said metallic contaminants.

11. The apparatus as recited in claim 8, further comprising means for changing the pH of said soil so that the reaction rates between said metallic contaminants and said sulfides and sulfates increase.

12. The apparatus as recited in claim 8, wherein said injecting means is a substantially horizontal injection well and said extracting means is a substantially horizontal extraction well.

* * * * *